US011155738B2

(12) United States Patent
Gupte et al.

(10) Patent No.: US 11,155,738 B2
(45) Date of Patent: *Oct. 26, 2021

(54) BRANCHED TRIGLYCERIDE-BASED FLUIDS USEFUL FOR DIELECTRIC AND/OR HEAT TRANSFER APPLICATIONS

(71) Applicant: Dow Global Technologies LLC, Midland, MI (US)

(72) Inventors: Kaustubh Gupte, Mumbai (IN); Bharat I. Chaudhary, Princeton, NJ (US); Domonique Downing, Midland, MI (US); Nolan T. McDougal, Houston, TX (US); Sreejit Nair, Mumbai (IN)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,729

(22) Filed: Dec. 10, 2019

(65) Prior Publication Data

US 2020/0115606 A1 Apr. 16, 2020

Related U.S. Application Data

(63) Continuation of application No. 15/520,034, filed as application No. PCT/IN2014/000676 on Oct. 22, 2014, now Pat. No. 10,533,121.

(51) Int. Cl.
| | |
|---|---|
| *C09K 5/10* | (2006.01) |
| *C11C 3/02* | (2006.01) |
| *C11C 1/00* | (2006.01) |
| *H01B 3/20* | (2006.01) |
| *H01F 27/12* | (2006.01) |

(52) U.S. Cl.
CPC .......... *C09K 5/10* (2013.01); *C11C 1/00* (2013.01); *C11C 1/002* (2013.01); *C11C 3/02* (2013.01); *H01B 3/20* (2013.01); *H01F 27/125* (2013.01)

(58) Field of Classification Search
CPC .................. C09K 5/10; C11C 3/02
See application file for complete search history.

(56) References Cited

U.S. PATENT DOCUMENTS

| | | | |
|---|---|---|---|
| 3,579,548 A | 5/1971 | Whyte | |
| 4,954,174 A * | 9/1990 | Imagawa | ........... C09D 11/16 106/31.64 |
| 5,766,517 A | 6/1998 | Goedde et al. | |
| 6,245,726 B1 | 6/2001 | Cannon et al. | |
| 6,340,658 B1 | 1/2002 | Cannon et al. | |
| 6,352,655 B1 | 3/2002 | Mcshane et al. | |
| 6,485,659 B1 | 11/2002 | Goedde et al. | |
| 6,645,404 B2 | 11/2003 | Oommen et al. | |
| 7,048,875 B2 | 5/2006 | Oommen et al. | |
| 7,622,844 B1 * | 11/2009 | Kuhlmann-Wilsdorf | .................... H01R 39/24 310/229 |
| 8,187,508 B2 | 5/2012 | Kano et al. | |
| 10,533,121 B2 * | 1/2020 | Gupte | ............ C09K 5/10 |
| 2004/0110050 A1 | 6/2004 | Abd Elhamid et al. | |
| 2006/0286265 A1 | 12/2006 | Herslof et al. | |
| 2007/0155635 A1 * | 7/2007 | Tagawa | ............ C10M 171/008 508/463 |
| 2007/0257229 A1 * | 11/2007 | Tagawa | ............ C10M 169/04 252/67 |
| 2017/0349800 A1 * | 12/2017 | Gupte | ............ C11C 1/00 |
| 2020/0115606 A1 * | 4/2020 | Gupte | ............ C11C 3/02 |

FOREIGN PATENT DOCUMENTS

| | | | | |
|---|---|---|---|---|
| EP | 2402956 B1 | 1/2013 | | |
| WO | 2004108871 A2 | 12/2004 | | |
| WO | WO-2004108871 A2 * | 12/2004 | ............ | C11C 3/10 |
| WO | 2007041785 A1 | 4/2007 | | |
| WO | 2012001041 A1 | 1/2012 | | |
| WO | 2012001044 A1 | 1/2012 | | |
| WO | WO-2012001041 A1 * | 1/2012 | ............ | H01B 3/20 |
| WO | WO-2012001044 A1 * | 1/2012 | ............ | C11C 3/14 |
| WO | 2013101376 A1 | 7/2013 | | |
| WO | WO-2013101376 A1 * | 7/2013 | ............ | C08F 10/00 |
| WO | 2014054048 A1 | 4/2014 | | |
| WO | 2014054049 A1 | 4/2014 | | |
| WO | WO-2014054048 A1 * | 4/2014 | ............ | A23D 9/00 |
| WO | WO-2014054049 A1 * | 4/2014 | ............ | A23D 9/00 |

OTHER PUBLICATIONS

L. Bohlin et al., Fette Seifen Anstrichmittel, 88.Jahrgang, No. 9, 1986, p. 340-344.
S. Gronowitz et al., Lipids, vol. 32, No. 6, 1997, p. 667-673.
L. Svensson et al., vol. 32, No. 6, 1997, p. 661-666.
V. Constantinou-Kokotou et al., Chem. Eur. J., 2004, 10, p. 1133-1140.

* cited by examiner

Primary Examiner — Nicole M. Buie-Hatcher
Assistant Examiner — M. Reza Asdjodi
(74) Attorney, Agent, or Firm — Qua

(57) ABSTRACT

A fluid composition comprises a triglyceride, having at least one alpha-branched fatty acid residue, wherein each alpha-branched fatty acid residue comprises at least one saturated or mono-unsaturated alkyl chain having a total number of carbon atoms ranging from 12 to 20, and wherein the triglyceride has at least one of (a) a flash point of at least 185° C., (b) a fire point of at least 230° C., (c) a pour point of −25° C. or lower, or (d) a combination thereof. The fluid composition may be useful, for example, as a dielectric fluid and/or as a heat transfer fluid in transformers and other electrical device applications.

15 Claims, No Drawings

BRANCHED TRIGLYCERIDE-BASED FLUIDS USEFUL FOR DIELECTRIC AND/OR HEAT TRANSFER APPLICATIONS

The present invention relates to the field of fluid compositions useful in dielectric and/or heat transfer applications. More particularly, it relates to novel branched triglycerides that provide desirable flash points, fire points, and/or pour points for use in applications, such as in transformers.

The primary function of transformers is to raise or lower the alternating voltage in a substation according to requirements, in order to transmit electricity at a low loss over long distances via transmission and distribution lines. During this process the transformer may become extremely hot, and this heat must be dissipated, typically by means of a liquid coolant, more frequently referred to as a heat transfer fluid.

Thermal management of transformers is very critical for the safety of transformer operation. Although conventional transformers operate efficiently at relatively high temperatures, excessive heat is generally very detrimental to transformer life. This is because transformers contain electrical insulation which serves to prevent energized conductors or other components from contacting or arcing over other conductors, components, or internal circuitry. Heat degrades insulation, causing it to lose its ability to perform its intended insulation function. The higher the temperature experienced by the insulation, the shorter the life of the insulation. When insulation fails, an internal fault or short circuit may occur. To prevent excessive temperature rise and, as a consequence, premature transformer failure, transformers are generally filled with a liquid coolant to dissipate the relatively large quantities of heat generated during normal transformer operation. The coolant also functions as a dielectric fluid to electrically insulate the transformer components. The dielectric fluid must be able to cool and insulate for the service life of the transformer, which in some applications may be for 20 or more years. Because dielectric fluids cool the transformer by convection, the viscosity of a dielectric fluid at various temperatures is one of the key factors in determining its efficiency.

In recent years, mineral oils have been widely used in transformer applications, because they are good electrical insulators and also exhibit a high thermal conductivity. However, they are also significantly flammable, which represents a safety concern in certain indoor, factory and underground operations.

Those skilled in the art have developed alternatives to mineral oil, with varying performance success. For example, WO2013101376A1 describes a dielectric composition prepared using a metal-ligand complex as a pre-catalyst. The resulting fluid exhibits a hyperbranched poly(co-ethylene-α-olefin) or poly-α-olefin based structure and has a molecular weight of less than 10,000 Daltons (Da).

EP2402956B1 discloses dielectric fluids that are triglycerides having branched-chain fatty acid constituents, wherein at least one of the fatty acid chains contains cyclopentadiene or substituted cyclopentadiene.

WO2012001041A1 discloses triglycerides with branched-chain fatty acids wherein at least one of the fatty acid chains contains a heteroatom.

U.S. Pat. No. 6,645,404 discloses a high oleic acid, non-branched composition wherein 75 percent (%) is C18, 10% of which is di-unsaturated, 3% tri-unsaturated, and 8% saturated. The composition allegedly exhibits a pour point of −40 degrees Celsius (° C.).

It is thus highly desirable to provide dielectric fluids that are able to achieve a desirable balance of properties at typical transformer operation temperatures. This means that such dielectric fluids have a relatively high flash point, preferably at least 185° C.; a relatively high fire point, preferably at least 230° C.; a pour point that is −25° C. or lower; or a combination of some or all of these properties. Additionally, it is desirable that the fluid exhibits desirable thermal oxidation stability, such that it maintains its effectiveness over a considerable time period despite its role to continually or frequently dissipate large amounts of heat. In addition it is desirable that the dielectric fluid be relatively economically and conveniently prepared.

In one aspect the invention provides a fluid composition comprising a triglyceride, having at least one alpha-branched fatty acid residue, wherein each alpha-branched fatty acid residue comprises at least one alkyl chain having a total number of carbon atoms ranging from 12 to 20, and is saturated or mono-unsaturated, and wherein the triglyceride has at least one of (a) a flash point of at least 185° C., (b) a fire point of at least 230° C., (c) a pour point of −25° C. or lower, or (d) a combination thereof. Such composition may be useful as, for example, a dielectric fluid and/or a heat transfer fluid in transformer applications.

In a second aspect the invention provides an electrical device comprising the inventive fluid composition as a dielectric fluid.

The inventive fluid composition includes at least one member of a particular subgroup of triglycerides, selected from certain compounds having associated molecular structures. These compounds are triglycerides (alternatively termed triacylglycerols) comprising a glycerol residue and the residue of at least one, at least two, or up to three alpha-branched fatty acid residues, where each alpha-branched fatty acid residue has a total carbon number ranging from 12 to 20, or from 14 to 18. This means that the triglyceride can be a relatively bulky molecule derived from dodecanoic (lauric) acid; tridecanoic (tridecylic) acid; tetradecanoic (myristic) acid; pentadecanoic (pentadecylic) acid; hexadecanoic (palmitic) acid; heptadecanoic (margaric) acid; octadecanoic (stearic) acid; nonadecanoic (nonadecyl) acid; and/or eicosanoic (arachidic) acid. As is well-known in the art, a "fatty acid" is a carboxylic acid having an alkyl chain bound to the carbonyl carbon of the carboxylic acid. As used herein, the term "alpha-branched fatty acid" means a fatty acid in which the alkyl chain carbon that is closest to the carbonyl carbon (i.e., that alkyl chain carbon is termed the "alpha carbon") serves as a branch point in the alkyl chain. In other words, the alpha carbon of the alpha-branched fatty acid is either a tertiary or quaternary carbon. In various embodiments, the alpha carbon of the alpha-branched fatty acid is a tertiary carbon. While not wishing to be bound by any theory, it is speculated that incorporation of the described branching in the molecules will tend to disrupt formation of the crystal lattice as the temperature lowers, thereby effectively reducing the pour point of the triglycerides that incorporate such alpha-branched fatty acids.

In some embodiments the carboxyl group of the alpha-branched fatty acid residue may be located in a relatively central location on the alkyl chain. This means that the carboxyl group can be, in certain particular embodiments, located at a point from C6 to C10 on the alkyl chain, e.g., approximately C5-C6 in the case of a fatty acid residue derived from dodecanoic acid; C6-C7 in the case of a fatty acid residue derived from tridecanoic acid or tetradecanoic acid; C7-C8 in the case of a fatty acid residue derived from pentadecanoic acid or hexadecanoic acid; C8-C9 in the case of a fatty acid residue derived from heptadecanoic acid or octadecanoic acid; and C9-C10 in the case of a fatty acid residue derived from nonadecanoic acid or eicosanoic acid.

Another feature of the selected triglycerides is that they may contain one or more pendant methyl moieties on the alkyl chains. In certain embodiments the triglycerides can contain zero, one, or two methyl substitutions per branch. As with the location of the carboxyl group(s), ensuring a relatively low number and size of pendant moieties on the alkyl chain is speculated to assist in ensuring a desirably low pour point. It will thus be clear that the inventive fluid compositions comprise triglycerides that may contain residues of such methyl-branched isomers of each of the C12-C20 fatty acids.

In general, it is accepted understanding that higher levels of unsaturation tend to lower pour point. However, as shown in Table 3 hereinafter, degree of unsaturation alone, whether monounsaturation or polyunsaturation, does not, in itself, predict pour point. The inventors hereof have found that very low pour points in their inventive compositions may be obtained for triglycerides which comprise fatty acids that are either fully saturated or only mono-unsaturated. Furthermore, the inventive materials also exhibit improvements in oxidative stability, particularly in comparison with some polyunsaturated materials.

Examples of suitable triglyceride molecules represented herein as suitable inventive fluid compositions may include, but are not limited to, triglycerides that may be prepared from glycerol and saturated or mono-unsaturated C12-C20 carboxylic acids, such as iso-hexadecanoic acid; iso-octadecanoic acid (e.g., "FINEOXOCOL™ iso-stearic acid N"; FINEOXOCOL™ is a trademark of Nissan Chemical America Corporation); iso-tetradecanoic acid; and combinations thereof. Triglyceride structures of three non-limiting fatty acids are provided in Example 2. It is noted that combinations of any of the novel molecule selections as defined herein may be employed to form a useful fluid composition, and furthermore that any of the novel molecule selections may be combined with other known and yet-to-be-identified fluids to form useful and, particularly, commercially effective fluid compositions, including dielectric and/or heat transfer fluid compositions. In another embodiment, the fluid compositions of the invention may be blended with any other oil including, but not limited to, other triglycerides and/or mineral oil.

The fluid compositions of the invention exhibit a variety of highly useful properties that renders them particularly desirable for applications such as in or as transformer fluids. As already noted, such fluids may exhibit desirable levels of dielectricity, i.e., they may tend to be relatively poor conductors of electricity, but are efficient supporters of an electrostatic field. "Poor conductivity" of electricity is herein defined as conductivity of less than a millionth ($10^{-6}$) of a Siemens. "Support" of an electrostatic field means that the fluid composition is adequately polarized upon application of an electric current in, for example, a transformer, in order to reduce or prevent corona discharge and increase capacitance to a desired extent. "Dielectric fluid" and "dielectric," as the terms are used herein, therefore refer to fluids, most typically liquids, that either do not conduct, or conduct at a very low level, an electric current under the usage conditions.

In addition, the novel compositions preferably exhibit a flash point of at least 185° C., more preferably at least 230° C., and most preferably at least 275° C.; a fire point of at least 230° C., more preferably at least 265° C., and most preferably at least 300° C.; and a pour point of −25° C. or lower, more preferably −35° C. or lower, and most preferably −45° C. or lower. These properties all contribute to making the inventive compositions highly desirable for a variety of applications as dielectric and/or heat transfer fluids.

In particular the inventive compositions may exhibit a dynamic viscosity at 40° C. that is less than 900 centipoise (cP, about 0.9 Pascal*seconds, Pa*s), preferably less than 500 cP (about 0.5 Pa*s), and more preferably less than 400 cP (about 0.4 Pa*s). In certain particular but non-limiting embodiments, the dielectric fluid compositions of the invention may have a dynamic viscosity at 40° C. of less than 200 cP (about 0.2 Pa*s), preferably less than 150 cP (about 0.15 Pa*s), and most preferably less than 100 cP (about 0.1 Pa*s).

The compositions of this invention may be particularly useful as dielectric fluids in various electrical devices or equipments, e.g., as an insulating oil in transformers. Furthermore, these may be environmentally friendly, e.g., biodegradable, and in certain particular embodiments may possess a desirable balance of properties, specifically a desirable balance of properties such as viscosity, flash point, fire point and pour point.

In general, synthesis of the novel triglycerides of the invention involves, first, synthesis or procurement of the relevant alpha-branched fatty acid, followed by reaction thereof with glycerol. The reaction with glycerol may be facilitated by first reacting the alpha-branched fatty acid with a highly-reactive halogenated, e.g., chloro-containing, molecule, such as oxalyl chloride, to form the acid chloride. This acid chloride may then be reacted with glycerol under conventional conditions, including a temperature ranging from 25° C. to 50° C., in the presence of 4-(dimethylamino) pyridine and pyridine, and with a diluent such as dichloromethane. Other temperatures, for example, up to 110° C.; other reagents, for example, triethylamine or dicyclohexylcarbodiimide, for base-mediated conditions, or hydrochloric acid, toluene sulphonic acid, sulphuric acid, or phosphoric acid, for acid-mediated conditions; and/or other diluents, for example, chloroform, for base-mediated conditions, benzene or toluene, or acid-mediated conditions; may alternatively be employed. Characterization of the resulting triglyceride may be carried out by, for example, $^1$H NMR at 400 megahertz (MHz) using $CDCl_3$.

In another embodiment, synthesis may be carried out via initial preparation of an aldehyde, which is then converted to a fatty acid via reaction with, for example, sodium chlorite, and the product thereof is then reacted with the glycerol to form the final alpha-branched triglyceride.

Further illustration of synthetic procedures, as well as performance testing, is included herein below in the Examples. Such are intended to be illustrative only and do not comprehensively define or describe the scope of the invention, but rather provide information to enable the skilled practitioner to more easily understand and/or reproduce just a few of the invention's many potential embodiments.

EXAMPLE 1

Triglyceride Synthetic Procedures
1. Preparation of iso-palmitic triglyceride (I)

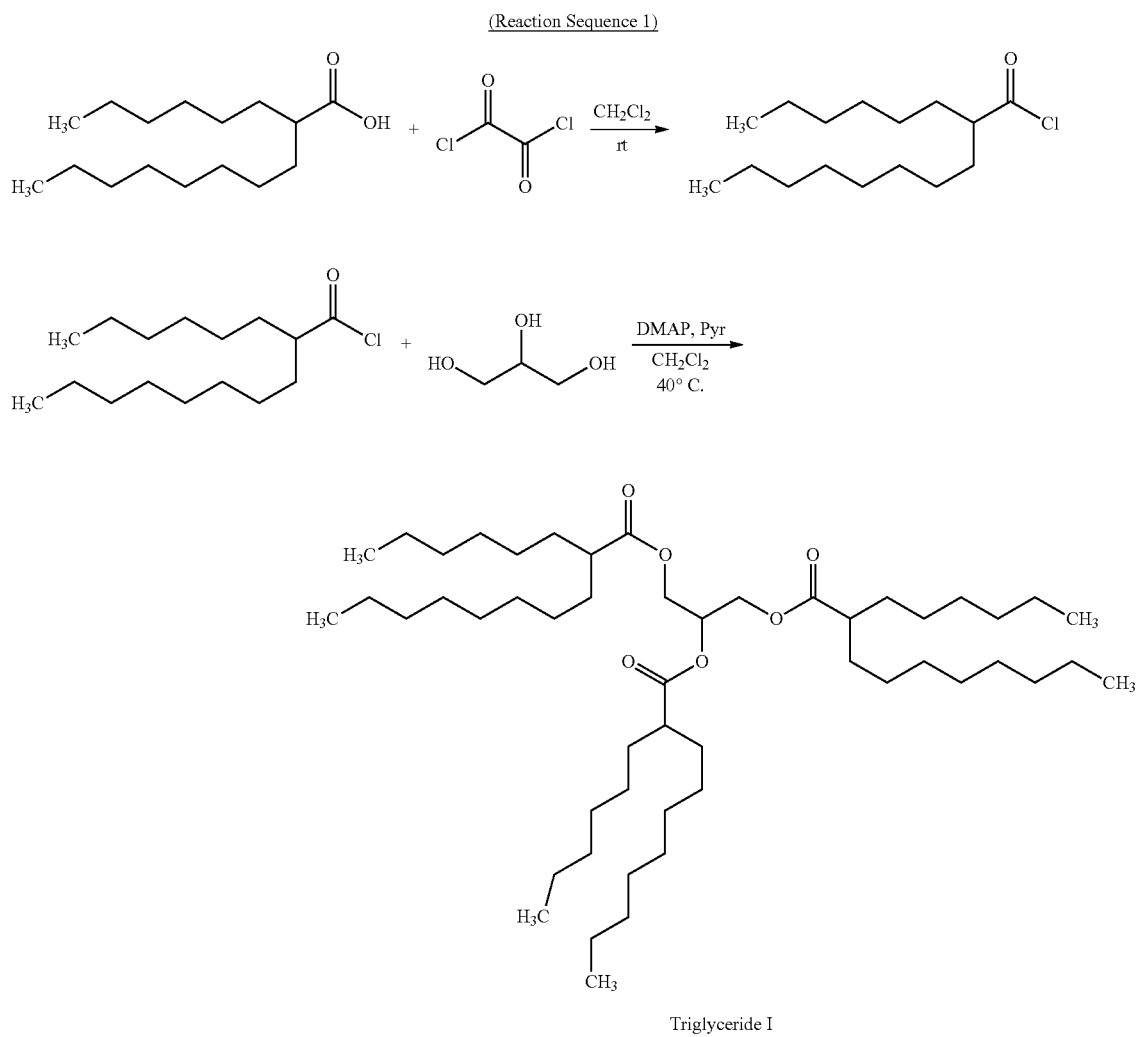

Triglyceride I

A. Preparation of acid chloride:

A solution of iso-palmitic acid (50.08 grams, g, 195.3 millimoles, mmol) in 200 milliliters (mL) of dichloromethane is prepared in an oven-dried 500-mL flask with an attached bubbler and placed under nitrogen. A solution of oxalyl chloride (25.1 mL, 292 mmol, 1.5 equivalents, equiv) in 50 mL of dichloromethane is added to the solution dropwise over 15 minutes (min), with bubbling occurring upon addition. The reaction is allowed to stir overnight. The volatile components are removed under reduced pressure, giving the product as a yellow oil (acid chloride). The yellow crude acid chloride is used in the following step without further purification.

B. Preparation of iso-palmitic triglyceride (I):

An oven-dried 500-mL flask is charged with 4-(dimethylamino)pyridine (1.19 g, 9.75 mmol, 0.18 equiv) and 200 mL of dichloromethane. The apparatus is then placed under a nitrogen atmosphere. Pyridine (17.3 mL, 214 mmol, 3.9 equiv) and glycerol (5.1 g, 55 mmol, 1.0 equiv) are then added to the solution via syringe. Iso-palmitic acid chloride (53.6 g, 195 mmol, 3.5 equiv), synthesized in the previous step, is diluted with 50 mL of dichloromethane and added to the reaction solution dropwise over 15 min under nitrogen. The reaction is stirred at room temperature overnight. The solution is then heated at 40° C. for 16 hr. The reaction mixture is filtered and then diluted with dichloromethane. The organic layers are washed with water, saturated $NaHCO_{3(aq)}$, and brine, and then dried over $Na_2SO_4$, filtered, and concentrated to afford the product as an oil. Yield: 44.2 g (54.8 mmol, 99%). Yields from multiple experiments are combined and the triglyceride is separated from impurities via wiped film evaporator.

$^1$H NMR (400 MHz, $CDCl_3$) δ 5.24 (m, 1H, $OCH_2CHCH_2O$), 4.33 (m, 2H, OCHHCH), 4.08 (m, 2H, OCHHCH), 2.31 (m, 3H, $COCHCH_2$), 1.55 (m, 6H, $CHCH_2CH_2$), 1.42 (m, 6H, $CHCH_2CH_2$), 1.24 (m, 60H, overlapping signals for $CH_2$—$(CH_2)_n$—$CH_3$), 0.86 (t, $J_{HH}$=7.2 Hz, 18H, $CH_2CH_3$) ppm.

2. Preparation of iso-stearic N triglyceride (II)

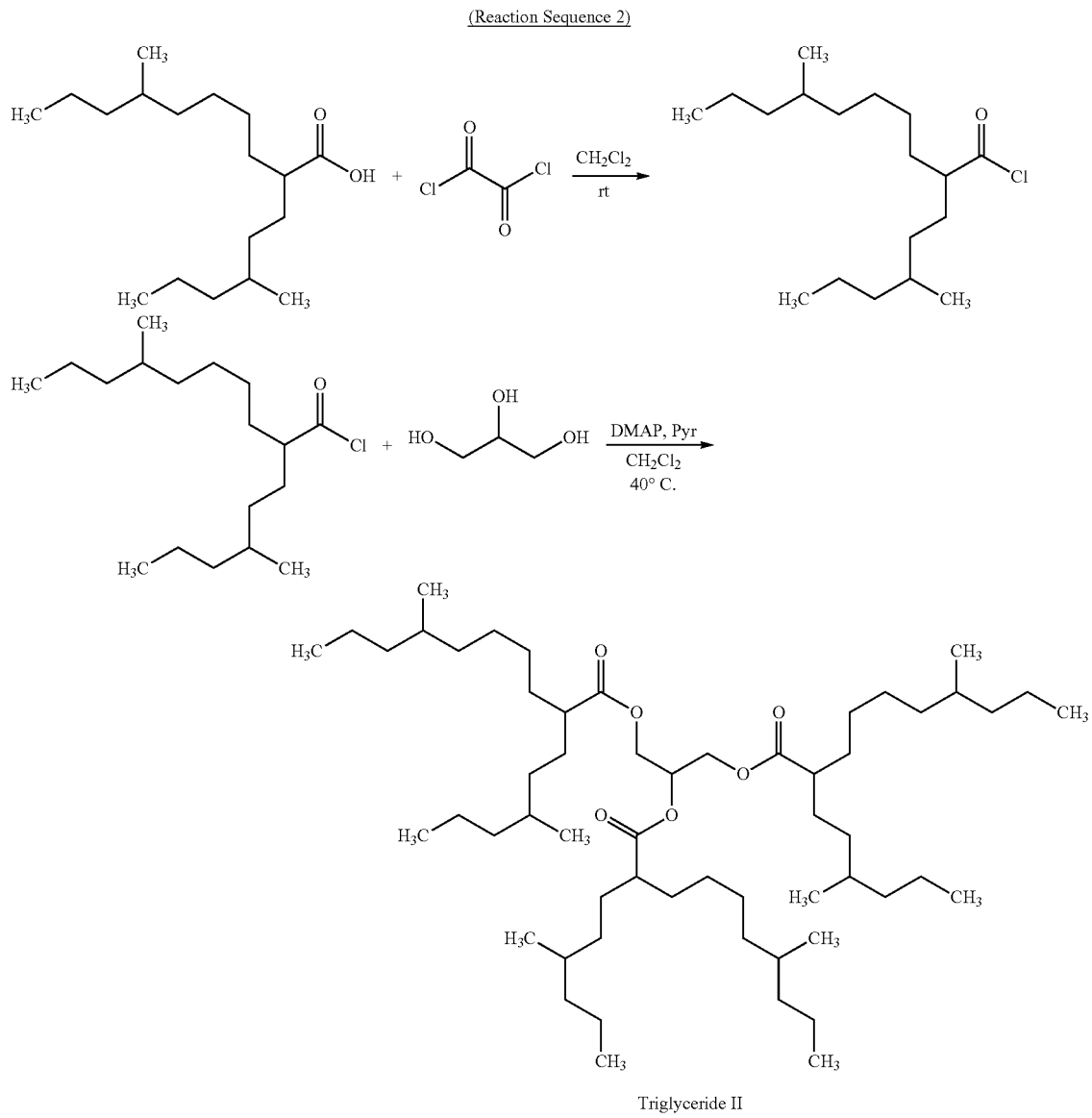

(Reaction Sequence 2)

Triglyceride II

A. Preparation of acid chloride:

A solution of iso-stearic acid N (30.30 g, 106.5 mmol) in 120 mL of dichloromethane is prepared in an oven-dried 500-mL flask. A bubbler is attached and the apparatus is placed under nitrogen. A solution of oxalyl chloride (13.8 mL, 161 mmol, 1.5 equiv) in 30 mL of dichloromethane is added to the solution dropwise over 15 minutes and bubbling immediately occurs. The reaction is allowed to stir overnight. The volatile components are removed under reduced pressure. The yellow crude acid chloride is used in the following step without further purification.

B. Preparation of iso-stearic triglyceride II:

A solution of 4-(dimethylamino)pyridine (0.649 g, 5.31 mmol, 0.17 equiv) and 120 mL of dichloromethane are charged to an oven-dried 500-mL flask and placed under a nitrogen atmosphere. Pyridine (9.5 mL, 120 mmol, 3.9 equiv) and glycerol (2.8 g, 30 mmol, 1.0 equiv) are then added to the solution via syringe. Iso-stearic acid N chloride (31.95 g, 105.5 mmol, 3.47 equiv), synthesized in the previous step, is diluted with 30 mL of dichloromethane and added to the reaction solution dropwise over 15 minutes under nitrogen. The reaction is stirred at room temperature overnight. The solution is then heated at 40° C. for 16 hr. The reaction mixture is filtered and then is diluted with dichloro-methane. The organic layer is washed with water, saturated NaHCO$_{3(aq)}$, and brine. The solution is then dried over Na$_2$SO$_4$, filtered, and concentrated to afford the product as an oil. Yield: 22.56 g (25.31 mmol, 84.0%). Yields from multiple experiments are combined and the triglyceride is separated from impurities via wiped film evaporator.

$^1$H NMR (400 MHz, CDCl$_3$) δ 5.24 (m, 1H, OCH$_2$CHCH$_2$O), 4.32 (m, 2H, OCHHCH), 4.09 (m, 2H, OCHHCH), 2.36 (m, 3H, COCHCH$_2$), 1.54 (m, 6H, CH$_2$CH (CH$_3$)CH$_2$), 1.23 (m, 60H, overlapping signals for CH$_2$), 0.78 (m, 36H, overlapping signals for CH$_3$) ppm.

3. Preparation of unsaturated C14 triglyceride (Ill)

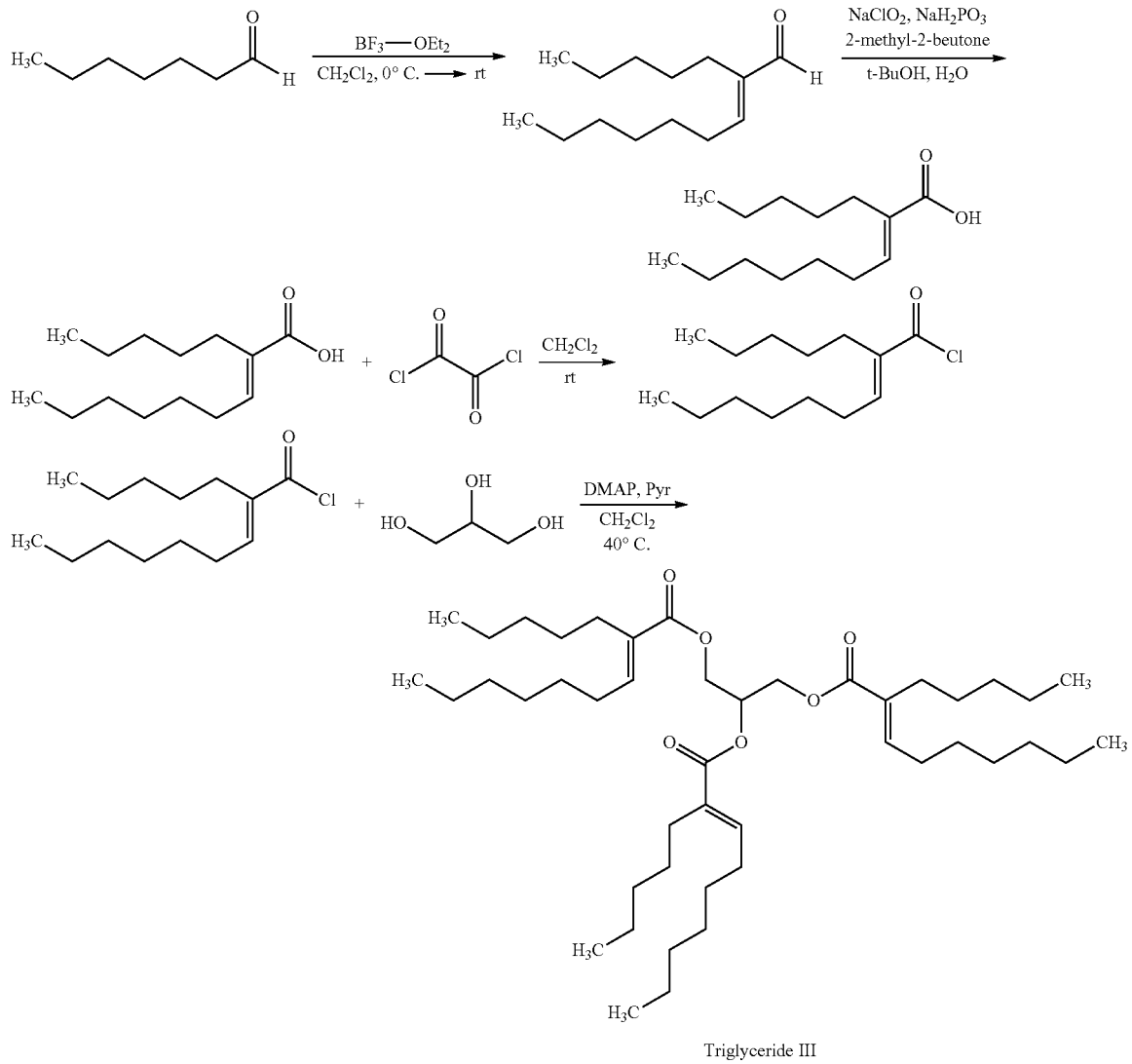

Triglyceride III

A. Preparation of aldehyde:

A solution of heptanal (32.5 mL, 233 mmol) in 250 mL anhydrous dichloromethane is prepared in an oven-dried 500-mL flask and chilled with an ice bath. Boron trifluoride-diethyl etherate (34.5 mL, 280 mmol, 1.2 equiv) is added to the solution dropwise over 15 min via an oven-dried addition funnel under a nitrogen atmosphere. The reaction is stirred for 15 min at 0° C., then the ice bath is removed and the reaction stirred for an additional 3 hr. After 3 hr the reaction is quenched with the addition of 250 mL of saturated $NaHCO_{3(aq)}$ to the reaction solution within a large Erlenmeyer flask, followed by the slow addition of solid $NaHCO_3$ until bubbling stops. The mixture is then extracted with dichloromethane within a separatory funnel. The combined organic layers are washed with water and brine. The organic solution is then dried over $Na_2SO_4$, filtered, and concentrated. (E)-2-pentylnon-2-enal is obtained as a yellow oil. Yield: 17.82 g (84.72 mmol, 72.7%).

$^1$H NMR (400 MHz, $CDCl_3$) δ 9.34 (s, 1H,CHO), 6.42 (t, $J_{HH}$=7.2 Hz, 1H, COCCHCH$_2$), 2.33 (q, $J_{HH}$ 7.6 Hz, 2H, CHCH$_2$CH$_2$), 2.21 (t, $J_{HH}$=7.2 Hz, 2H, COCCH$_2$CH$_2$), 1.37 (m, 14H, overlapping signals for CH$_2$—(CH$_2$)$_n$—CH$_3$), 0.87 (m, 6H, overlapping signals for CH$_3$) ppm.

B. Preparation of fatty acid:

To a 500-mL flask is charged the α,β-unsaturated aldehyde (25.01 g, 118.9 mmol) and 150 mL of t-butanol. The 2-methyl-2-butene (84.2 mL, 795 mmol, 6.7 equiv) is then added to the flask with stirring. A solution of 80% pure sodium chlorite (17.52 g, 155.0 mmol, 1.3 equiv) and sodium dihydrogen phosphate (18.55 g, 154.6 mmol, 1.3 equiv) in 150 mL water is prepared in an Erlenmeyer flask and added to the reaction flask dropwise over 45 min. The reaction temperature rises 7° C. over the course of the addition of the aqueous solution. The biphasic solution is stirred at room temperature overnight. The following day, the reaction mixture is diluted with 350 mL of water and extracted with two (2) 126-mL portions of hexane. The aqueous phase is acidified to a pH of 2 (with 10% $HCl_{(aq)}$), saturated with NaCl, and extracted with three (3) 175-mL portions of ether. The combined organic layers are dried with MgSO$_4$ and concentrated. The resulting residue is purified via silica gel chromatography to afford (E)-2-pentylnon-2-enoic acid as an oil. Yield: 24.24 g (107.1 mmol, 90.1%).

$^1$H NMR (400 MHz, CDCl$_3$) δ 6.86 (t, J$_{HH}$=7.6 Hz, 1H, COCCHCH$_2$), 2.26 (t, J$_{HH}$=7.6 Hz, 2H, COCCH$_2$CH$_2$), 2.18 (q, J$_{HH}$=7.2 Hz, 2H, CHCH$_2$CH$_2$), 1.34 (m, 14H, overlapping signals for CH$_2$—(CH$_2$)$_n$—CH$_3$), 0.87 (m, 6H, overlapping signals for CH$_3$) ppm.

C. Preparation of acid chloride:

A solution of (E)-2-pentylnon-2-enoic acid (65.2 g, 288.0 mmol) in 200 mL of dichloromethane is charged to an oven-dried 500-mL flask with a bubbler. A solution of oxalyl chloride (50.0 mL, 583 mmol, 2.0 equiv) in 50 mL of dichloromethane is added to the solution under a nitrogen atmosphere slowly over 15 min. Gas begins to flow through the bubbler immediately upon addition. The reaction is allowed to stir overnight, after which the reaction is complete as indicated by the lack of gas flowing through the bubbler. The volatile components are removed under reduced pressure. The yellow crude acid chloride is used in the following step without further workup.

D. Preparation of unsaturated C14 triglyceride (III):

A solution of 4-(dimethylamino)pyridine (1.80 g, 14.73 mmol, 0.18 equiv) and 200 mL of dichloromethane is charged to an oven-dried 500-mL flask and placed under nitrogen. Pyridine (26.0 mL, 323 mmol, 3.9 equiv) and glycerol (7.60 g, 82.5 mmol, 1.0 equiv) are then added to the solution via syringe. (E)-2-pentylnon-2-enoic acid chloride (70.51 g, 288.0 mmol, 3.5 equiv), synthesized in the previous step, is diluted with 50 mL of dichloromethane and added to the reaction solution dropwise over 15 min under nitrogen. The reaction is stirred at room temperature overnight. The solution is then heated at 40° C. for 16 hr. The reaction mixture is filtered and then diluted with dichloromethane. The organic layer is washed with water, saturated NaHCO$_{3(aq)}$, and brine. The solution is then dried over Na$_2$SO$_4$, filtered, and concentrated to afford the product as a yellow oil. Yield: 57.1 g (79.6 mmol, 96.4%). Yields from multiple experiments are combined and the triglyceride is separated from impurities via a wiped film evaporator.

$^1$H NMR (400 MHz, CDCl$_3$) δ 6.73 (t, J$_{HH}$=7.6 Hz, 3H, COCCHCH$_2$), 5.42 (m, 1H, OCH$_2$CHCH$_2$O), 4.39 (m, 4H, OCH$_2$CH), 2.24 (t, J$_{HH}$=7.2 Hz, 6H, COCCH$_2$CH$_2$), 2.15 (m, 6H, CHCH$_2$CH$_2$), 1.41 (m, 42H, overlapping signals for CH$_2$—(CH$_2$)$_n$—CH$_3$), 0.86 (m, 18H, overlapping signals for CH$_2$CH$_3$) ppm.

EXAMPLE 2

Properties of Triglycerides Synthesized in Example 1

Three example triglycerides, corresponding in molecular structure to the following, are prepared as described in Example 1 (1.) for Sample I [iso-palmitic triglyceride (I)]; Example 1 (2.) for Sample II [iso-stearic N triglyceride (II)]; and Example 1 (3.) for Sample Ill [unsaturated C14 triglyceride (III)].

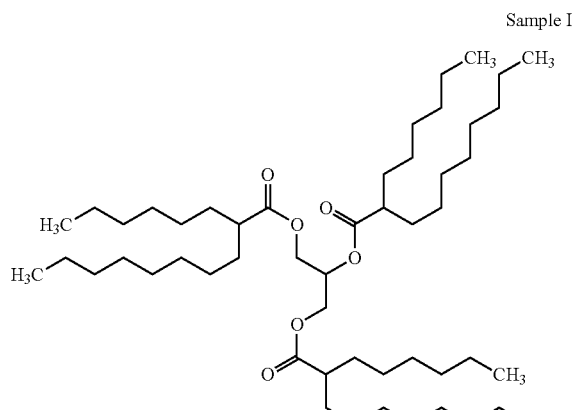

I. iso-palmitic acid

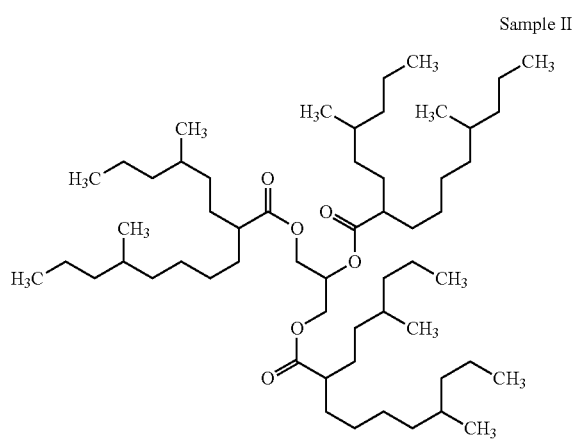

II. iso-stearic N acid

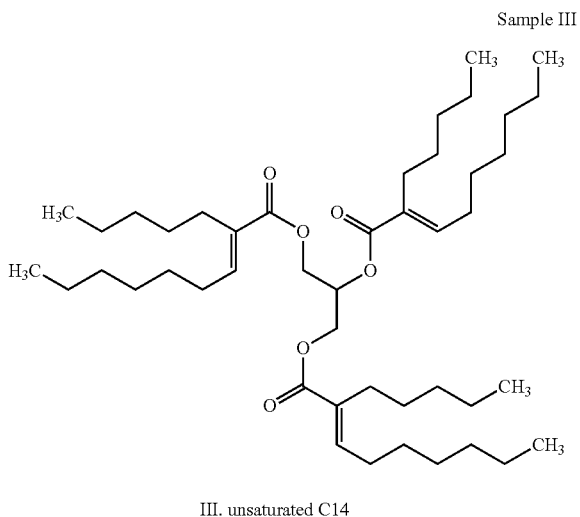

III. unsaturated C14

Testing to determine pour point is carried out via the environmental chamber method. This method involves transferring 500 microliters (μL) of each sample into a vial via pipette and placing it into a 96-well aluminum vial tray.

A copper bead ("BB") is placed in each vial and the vials are capped with a clear cap mat (Sun-SRI™ MicroMat™ made of silicon for 96 well plates/#300-002VWR). The aluminum tray is then placed in a fitted foam container for insulation and placed in an environmental chamber (Model 1007S Temperature Chamber available from TestEquity™). The chamber is set to a desired temperature and the sample is maintained therein for at least 4 hr. Measurements in this study are taken in 5° C. increments. The setup is then removed from the chamber, inverted onto a scanner, and scans are taken at intervals of 15 seconds (sec) for the duration of one min. Photographs are digitally scanned in .jpg format at the 1-min mark in order to confirm the ability of the oil to flow, provided that the BB can be seen in the scan. Conversely, the absence of the BB is considered to be a negative result, indicating the failure of the oil to flow at that temperature. Results of testing are shown in Table 1.

TABLE 1

Properties of Example 2 - Samples I to III

|  | I. Triglyceride of iso-palmitic acid | II. Triglyceride of iso-stearic acid N[6] | III. Triglyceride of unsaturated C14 acid |
| --- | --- | --- | --- |
| Dynamic Viscosity @ 40° C.[1] (Pa*s)[5] | 0.0478 | 0.0834 | 0.0319 |
| Pour Point[2] (° C.) | −25 | −45 | −35 |
| Flash point[3] (° C.) | 275 | 262 | 189 |
| Fire point[4] (° C.) | 317 | 310 | 233 |

[1]Dynamic viscosity @ 40° C. is measured via the protocol of ASTM D7042 (2012).
[2]Flash point is measured via the protocol of ASTM D92 (2012).
[3]Fire point is measured via the protocol of ASTM D92 (2012).
[4]Pour point is measured via the protocol of ASTM D97 (2012).
[5]Pa*s is Pascal*second.
[6]FINEOXOCOL™ iso-stearic acid N

COMPARATIVE EXAMPLE 1

Comparative samples (designated as CS1 to CS5) are also tested, using the same protocols as in Example 2. Materials compared include:

NEOBEE™ 1053 is a caprylic/capric triglyceride available from Stepan Company, made using glycerol from vegetable oil sources and medium-chain fatty acids from coconut or palm kernel oils. Manufacturer literature claims it has a viscosity at 25° C. of 0.025 Pa*s; a flash point of 260° C.; and a freezing point of −5° C.

BIOTEMP™ is a biodegradable dielectric fluid described as a property-enhanced vegetable oil combined with stabilizers to enhance oxidation stability, developed by ABB Inc. ENVIROTEMP™ FR3, which is available from Cargill, Incorporated, is described as a soy ester-based, renewable electrical insulation fluid.

It is noted that while some of the combinations exhibit high flash point and fire point, none experimentally exhibits a pour point herein that is lower than −21° C. Test results are shown in Table 2.

TABLE 2

Properties of Comparative Samples (CS) 1 to 5

| Concentration of Diluent in Mixture with HOCO (High Oleic Canola Oil) | C18:1 (oleic) content (wt %) | Dynamic Viscosity @40° C. (Pa*s) | Dynamic Viscosity @ 10° C. (Pa*s) | Flash Point (° C.) | Fire Point (° C.) | Pour Point (° C.) | Melting Point (° C.) |
| --- | --- | --- | --- | --- | --- | --- | --- |
| CS 1 - 100 wt % NEOBEE™ 1053 | 0 | 0.0138 | 0.050 | 250 | 284 | −9 | −4.4 |
| CS 2 - 100 wt % High Oleic Canola Oil | 74 | 0.033.2 | 0.132.2 | 324 | 350 | −15 | −13.3 |
| CS 3 - 75 wt % NEOBEE™ 1053 | 18.5 | 0.0175 | 0.066 | 260 | 290 | −15 | −17.5 |
| CS 4 BIOTEMP™ | — | 0.042 | — | 340 | 360 | −15 to −20 | — |
| CS 5 ENVIROTEMP[M] FR3 | — | 0.034 | — | 330 | 360 | −21 | — |

C18:1 = oleic acid with mono-unsaturation. (cf. C18:0 = unsaturated)
— indicates no data obtained

COMPARATIVE EXAMPLE 2

The saturation information, viscosity, pour point, and flash point data is obtained for a variety of naturally occurring oils. Again, it is noted that none of the commonly known oils has a pour point lower than −21° C. The information is comprised in Table 3. Fire point data, though not provided herein, is typically from 25° C. to 30° C. higher than flash point.

TABLE 3

Properties of oils obtained from various naturally occurring sources

| | % Saturation | % Mono-unsaturation | % Poly-unsaturation | Dynamic viscosity @40° C. (Pa*s) | Pour point (° C.) | Flash Point (° C.) |
|---|---|---|---|---|---|---|
| Coconut oil | 91.2 | 6.8 | 2 | 0.0276 | 25 | 294 |
| Cottonseed oil | 25.5 | 19.2 | 55.1 | 0.0335 | −15 | 234 |
| Rice bran oil | 18.5 | 40.3 | 40.1 | 0.0376 | −6 | — |
| Peanut oil | 18.7 | 50.1 | 31 | 0.0369 | 3 | — |
| Olive oil | 16.9 | 82 | 0.6 | 0.0383 | −9 | — |
| Sesame oil | 15.1 | 40.1 | 44.1 | 0.0346 | −6 | — |
| Soybean oil | 15.3 | 23.3 | 61.3 | 0.031 | −9 | 320 |
| Corn oil | 12.9 | 26.7 | 59.3 | 0.03192 | −15 | — |
| Sunflower oil | 12.7 | 18.8 | 68.3 | 0.0316 | — | 325 |
| Safflower oil | 10.5 | 15.5 | 73.4 | 0.0302 | −18 | — |
| Linseed oil | 9.5 | 20.2 | 69.1 | 0.0272 | −15 | 222 |
| Corn oil (62% oleic) | 9.9 | 63 | 26.4 | 0.0361 | −18 | 320 |
| Walnut oil | 10.03 | 16.2 | 73.4 | 0.027 | −15 | 257 |
| Sunflower oil (80% oleic) | 9.6 | 81.4 | 9 | 0.0388 | −12 | 326 |
| Canola oil (high oleic) | 6.3 | 74.3 | 17.2 | 0.0386 | −18 | 325 |
| Rapeseed oil (high erucic) | 6.8 | 66.5 | 25.5 | 0.04027 | −18 | — |
| Canola oil | 7.2 | 62.9 | 29.8 | 0.034 | −21 | 328 |
| Canola oil (75% oleic) | 4 | 74.5 | 20.3 | 0.0373 | −21 | 326 |
| Sunflower oil (90% oleic) | 4.5 | 89.5 | 5.5 | 0.0399 | −15 | 330 |

Source: Lawate, S.S., K. Lai, and Chor Huang, "Vegetable Oils-Structure and Performance," in Tribology Data Handbook, edited by E.R. Booser. CRC Press (1997).

The invention claimed is:

1. An electrical device comprising:
a transformer comprising a dielectric fluid composition that does not conduct an electric current, the dielectric fluid composition consisting of
(i) a triglyceride, having three alpha-branched fatty acid residues,
wherein each alpha-branched fatty acid residue comprises
at least one alkyl chain having a total number of carbon atoms ranging from 12 to 20, and is saturated or mono-unsaturated;
the carboxyl group of the alpha-branched fatty acid residue is located between C6 and C10 on the alkyl chain, the triglyceride selected from the group consisting of a triglyceride of iso-palmitic acid, a triglyceride of iso-stearic acid, and a triglyceride of unsaturated C14 acid; and
wherein the triglyceride has at least one of
(a) a flash point of at least 185° C.,
(b) a fire point of at least 230° C.,
(c) a pour point of −25° C. or lower, or
(d) a combination thereof; and
(ii) a mineral oil.

2. The electrical device of claim 1 wherein the alkyl chain contains at least one pendant methyl moiety.

3. The electrical device of claim 1 wherein the alkyl chain contains one or two pendant methyl moieties.

4. The electrical device of claim 1 wherein the triglyceride has at least one of (a) a flash point of at least 230° C.; (b) a fire point of at least 265° C.; (c) a pour point of −35° C. or lower; or (d) a combination thereof.

5. The electrical device of claim 1 wherein the triglyceride has (a) a flash point of at least 265° C.; (b) a fire point of at least 265° C.; and (c) a pour point of −35° C. or lower.

6. The electrical device of claim 1 wherein the triglyceride has at least one of (a) a flash point of at least 275° C.; (b) a fire point of at least 300° C.; (c) a pour point of −45° C. or lower; or (d) a combination thereof.

7. The electrical device of claim 1 wherein the triglyceride has (a) a flash point of at least 275° C.; (b) a fire point of at least 300° C.; and (c) a pour point of −45° C. or lower.

8. The electrical device of claim 1 wherein the dielectric fluid composition comprises a triglyceride that has (a) a fire point of at least 300° C.; and (b) a pour point of −45° C. or lower.

9. The electrical device of claim 1 wherein the dielectric fluid composition has a dynamic viscosity at 40° C. of 0.09 Pascal*second or lower.

10. The electrical device of claim 1 wherein the dielectric fluid composition has a conductivity of less than $10^{-6}$ Siemens.

11. The electrical device of claim 1, wherein the triglyceride has
(a) a flash point of at least 185° C.;
(b) a fire point of at least 230° C.;
(c) a pour point of −25° C. or lower;
(d) a dynamic viscosity at 40° C. of 0.09 Pascal*second or lower; and
(e) a conductivity of less than $10^{-6}$ Siemens.

12. The electrical device of claim 1 wherein the total number of carbon atoms in the alkyl chain is from 14 to 18.

13. The electrical device claim 12 wherein each alpha-branched fatty acid residue is mono-unsaturated.

14. An electrical device comprising:
a dielectric fluid composition that has a conductivity of less than a millionth of a Siemens and does not conduct an electric current, the dielectric fluid composition consisting of (1) a triglyceride, having at least one alpha-branched fatty acid residue,
  wherein each alpha-branched fatty acid residue comprises
    at least one alkyl chain having a total number of carbon atoms ranging from 12 to 20, and is saturated or mono-unsaturated;
    the carboxyl group of the alpha-branched fatty acid residue is located between C6 and C10 on the alkyl chain; and
  wherein the triglyceride has at least one of
    (a) a flash point of at least 185° C.,
    (b) a fire point of at least 230° C.,
    (c) a pour point of −25° C. or lower, or
    (d) a combination thereof;
(2) one or more other triglycerides; and
(3) mineral oil.

15. The electrical device of claim 14 wherein the electrical device comprises a transformer comprising the dielectric fluid composition.

* * * * *